March 19, 1935.   D. L. Y. G. CHÁVEZ ET AL   1,995,241
MECHANICAL SYSTEM FOR RAISING VEHICLES
Filed Oct. 26, 1932   5 Sheets-Sheet 1

D. Lombillo y Gonzalez Chavez
T. B. Gonzalez
A. C. Haro  INVENTORS

By: Marks & Clerk Attys.

March 19, 1935. D. L. Y G. CHÁVEZ ET AL 1,995,241
MECHANICAL SYSTEM FOR RAISING VEHICLES
Filed Oct. 26, 1932    5 Sheets-Sheet 2
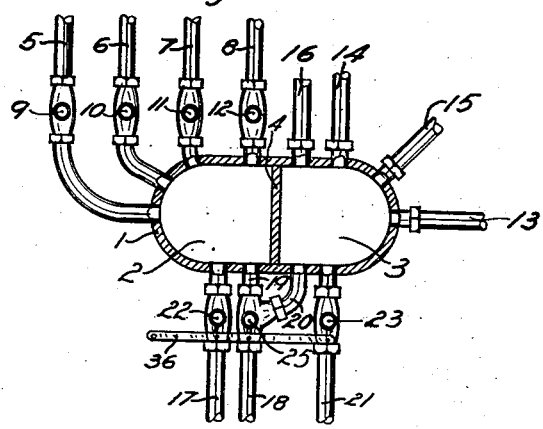
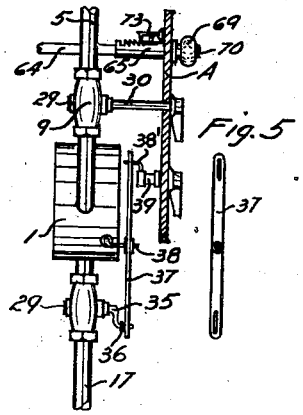
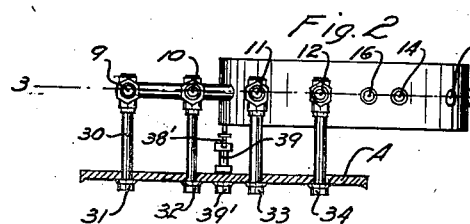
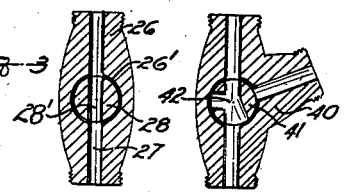
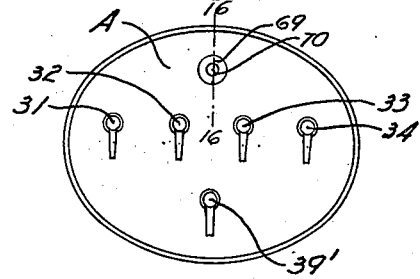
D. Lombillo y Gonzalez Chavez
T. B. Gonzalez
A. C. Haro INVENTORS
By: Marks+Clerk ATTYS.

March 19, 1935.  D. L. Y G. CHÁVEZ ET AL  1,995,241
MECHANICAL SYSTEM FOR RAISING VEHICLES
Filed Oct. 26, 1932  5 Sheets-Sheet 3
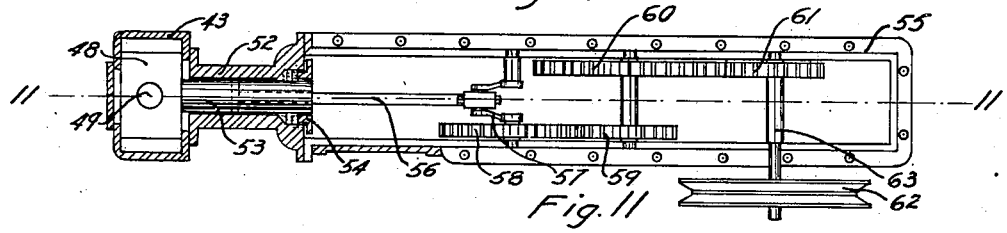
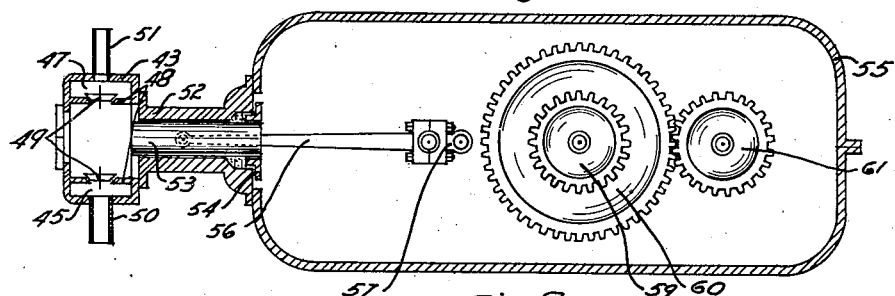
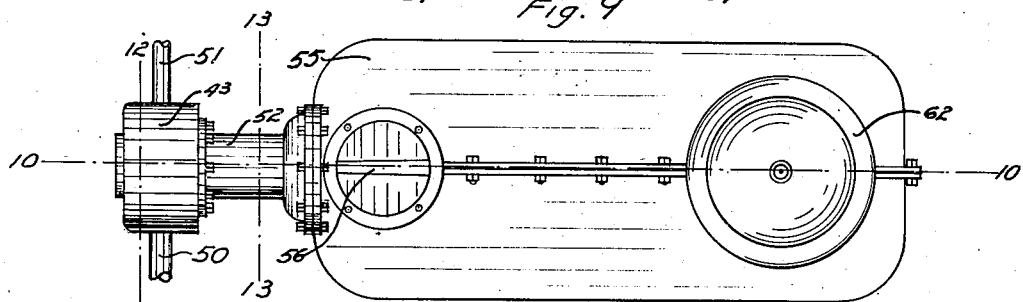
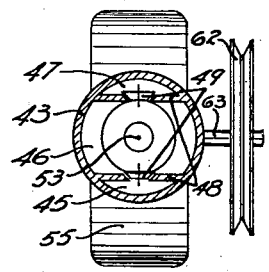
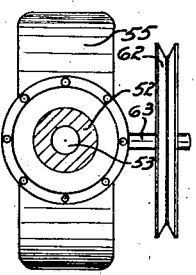
D. Lombillo y Gonzalez Chavez
T. B. Gonzalez
A. C. Haro INVENTORS
By: Marks & Clerk ATTYS.

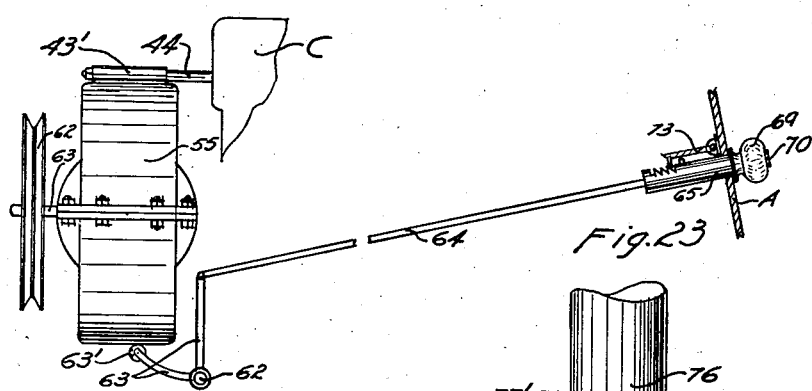
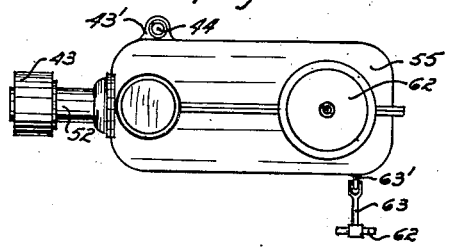
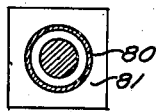
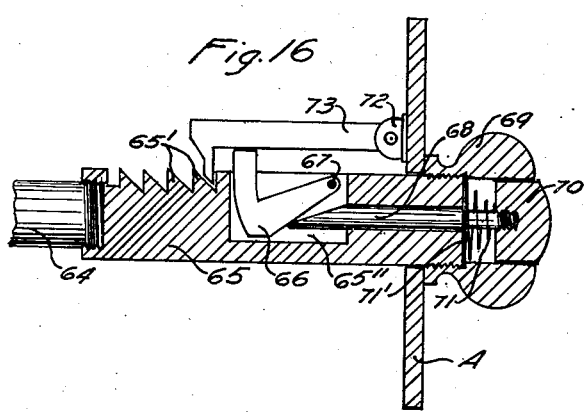
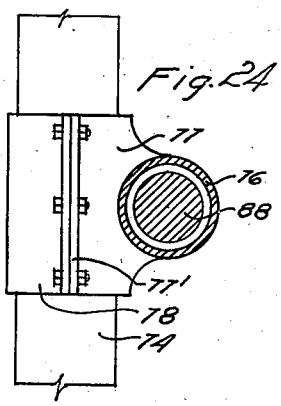

March 19, 1935.   D. L. Y G. CHÁVEZ ET AL   1,995,241
MECHANICAL SYSTEM FOR RAISING VEHICLES
Filed Oct. 26, 1932   5 Sheets-Sheet 5
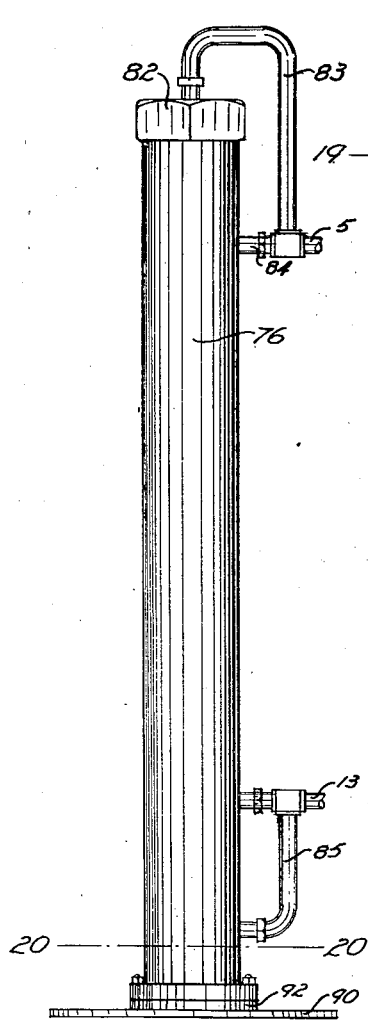
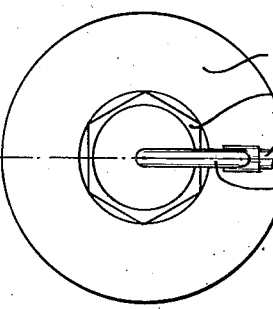
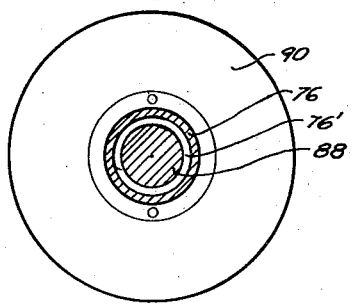
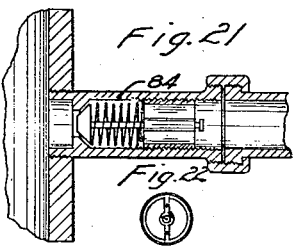
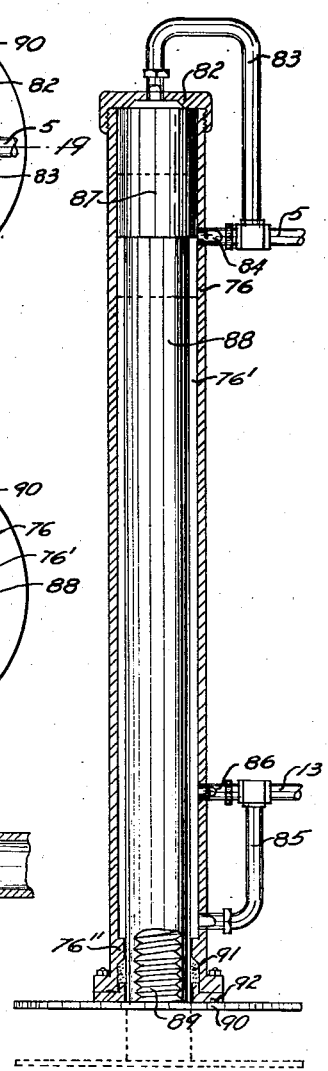
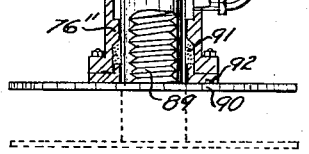
D. Lombillo y Gonzales Chavez
T. B. Gonzalez
A. C. Haro
INVENTORS
By Marks & Clark
ATTYS Patented Mar. 19, 1935

1,995,241

UNITED STATES PATENT OFFICE 1,995,241

MECHANICAL SYSTEM FOR RAISING VEHICLES

Diego Lombillo y González Chávez, Tomas Benitez González, and Angel Cobo Haro, Habana, Cuba Application October 26, 1932, Serial No. 639,716
In Cuba February 15, 1932

1 Claim. (Cl. 60—52)

This invention refers to a mechanical system for raising vehicles, specially automobiles, and has for its main object the provision of mechanical raising means for vehicles which act in co-ordination for such purpose and are operated from the driver's seat.

It is a further object of the invention to provide means whereby one or more of the wheels of the vehicle may be selectively raised from the driver's seat.

Other objects and advantages of the present invention will be understood afterwards, specially by those skilled in the art to which the invention appertains and with the aid of the attached drawings in which similar numerals of reference are intended for the same parts in the different views.

In the drawings:—

Figure 2 is an upper plan view of the distributor device included in the present invention.

Figure 3 is a vertical longitudinal section taken on line 3—3 of Figure 2.

Figure 4 is a front elevation of the distributor.

Figure 5 is a detailed view of one the parts included in the distributor.

Figures 6 and 7 are vertical sectional views in detail in enlarged scale, showing respectively a single and a double way cock used in the distributor.

Figure 8 is a fragmentary side elevational detail, showing the switch board to operate the system.

Figure 9 is a side elevation of the pumping device.

Figure 10 is a horizontal sectional view taken on line 10—10 of Figure 9.

Figure 11 is a vertical longitudinal section taken on line 11—11 of Figure 10.

Figure 12 is a cross section taken on line 12—12 of Figure 9.

Figure 13 is a cross sectional view taken on line 13—13 of Figure 9.

Figure 14 is a fragmentary side elevational detail, of the arrangement of the pumping device and its switch board connection.

Figure 15 is a front elevation of the pumping device.

Figure 16 is a sectional detail taken on line 16—16 of Figure 8.

Figure 17 is a side elevation of one of the raising means.

Figure 18 is an upper plan view of same.

Figure 19 is a diametrical vertical section taken on line 19—19 of Figure 18.

Figure 20 is a horizontal section taken on line 20—20 of Figure 17.

Figures 21 and 22 are detailed views of the check valves of the raising means.

Figures 23, 24 and 25 are detailed views of the means for securing the raising means to the shafts of the vehicle.

Figure 1:
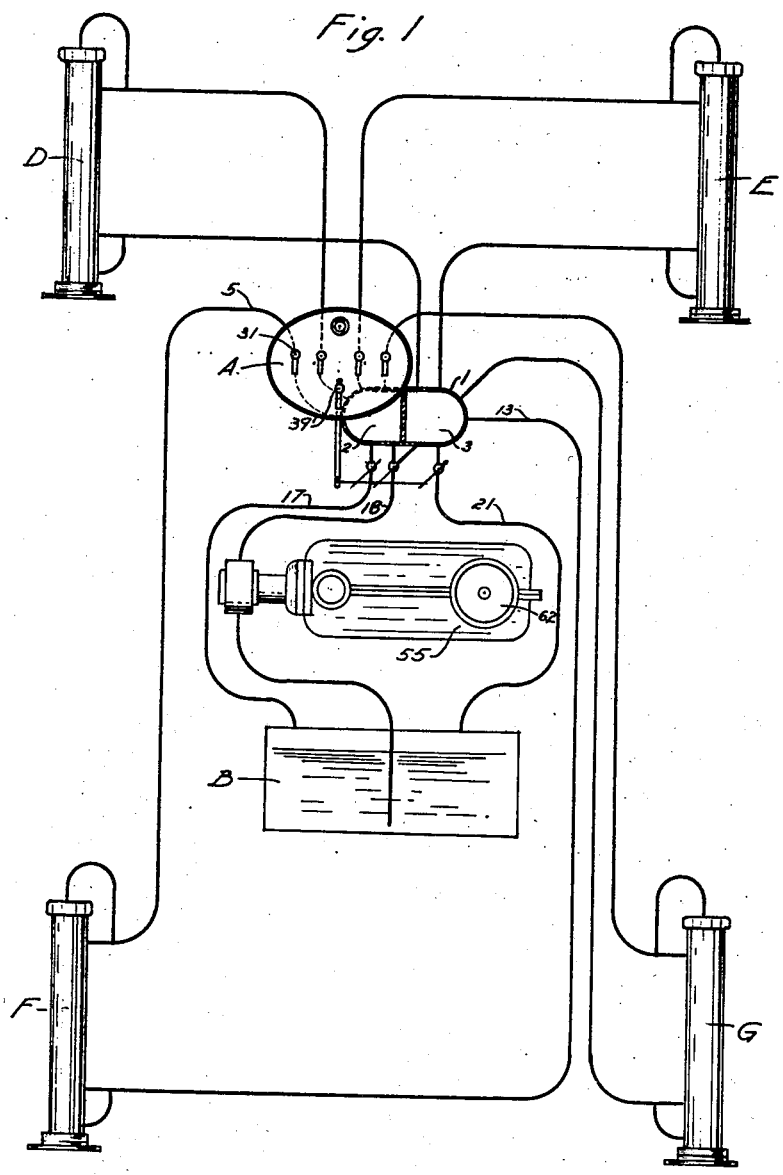
Figure 1 is a general view, somewhat diagrammatical, showing a preferred arrangement of the system.

Referring to Figures 1, 2, 3 and 4 of the drawings, there is provided a distribution casing 1, preferably arranged in the rear part of the board A, of the automobile where the system is installed. Said casing is divided into two compartments 2 and 3 by a partition 4, and has twelve bores in which are threaded the ends of pipes 5, 6, 7 and 8 communicating with compartment 2; said pipes being provided with cocks 9, 10, 11 and 12. The compartment 3 has connected thereto pipes 13, 14, 15 and 16 which are not provided with cocks; in the lower part of the casing 1 and in communication with compartment 2 of same are the pipes 17 and 18, the latter branched in pipes 19 and 20, of which 19 is connected with compartment 2 and 20 with compartment 3 of the casing 1. Another pipe 21 is connected to compartment 3.

Pipes 17 and 21 are provided with shut-off valves or cocks 22 and 23, and branches 19 and 20 communicate with pipe 18 through a double way cock 25.

As shown in Figure 6 cocks 9, 10, 11, 12, 22, and 23 include a casing 26 longitudinally bored as shown at 27, on the ends of which the corresponding pipes, are threaded. The casing has another bore in which a valve body 28 is fitted, said body having a bore 28' registering with bore 27 when the cock is open. The valve body 28 is secured to the casing 26 through a nut 29, as shown in Figure 4. The rear end of body 28 is mounted on an axle 30, which in the cocks 9, 10, 11 and 12 is extended to the board A within the reach of the driver by means of handles 31, 32, 33, and 34. The cocks 22, 23, and 25 have a crank 35 connected to a rod 37 pivotally mounted to an axle 38 secured outwardly to the casing 1. In the upper end of the rod 37 a crank 38' is connected by means of a slot and pin connection. The crank 38' is secured to an axle 39 of sufficient length to be operated in the board A through the handle 39'.

The double way cock 25, as detailed in Figure 7, is similar in construction to above referred cocks its casing 40 being of Y shape and the valve body 41 having divergent borings 42 registering with each of the pipes 19 and 20 for the passage of the fluid used.

The pipe 17 communicates with a fluid tank B, the fluid preferably used being oil, and the tank being arranged in the frame of the vehicle. Pipe 18 communicates with the casing 43 of a pumping device, which as illustrated in Figure 14 is swingingly suspended from a short shaft 44 secured to the engine block C, or in another suitable place, the suspension being maintained through the bearing 43' in the upper part of the casing 43.

The casing 43 includes three compartments, 45, 46, 47, the compartment 45 being the suction chamber, 46 the barrel and 47 the compression chamber. The partitions 48 which separate said chambers have valve openings fitted with conical valves 49, 50, and 51 designate the suction and compression pipes of the pump, the pipe 50 communicating with the tank B while the pipe 51 is connected to the pipe 18. Secured to the casing 43 is the cylinder 52 in which the plunger 53 acts, the latter being provided with the packing 54 and being operated through a mechanism enclosed within the casing 55, comprising a connecting rod 56 connected to a crank 57 connected to the gears 58, 59, 60 and 61, and driven through a pulley 62 mounted on a shaft 63 supported in bearings in the casing 55, and said pulley being connected to the driving shaft of the engine.

As shown in Figure 14 in a suitable place of the engine block there is a pin 62 in which is pivotally connected the angle lever 63 one of the arms which bears a roller 63' which engages with the lower part of the casing 55. The other arm of the lever is connected to a rod 64 of a suitable length to be operated from the board A, and which rod is threaded to a block 65 the upper face 65' of which is toothed. By 65" is designated a recess in the same block 65 wherein is housed a dog 66 pivoted to a horizontal pin 67.

The block 65 has an axial bore through which a stem 68 is mounted; said stem having its inner bevelled end engaging the dog 66, as shown in Figure 16.

One end of the block 65 is reduced in its section and threaded and a knob 69 is secured thereon. Said knob 69 has an opening through which fits snugly the head 70 which is threaded to one end of the stem 68, a spring 71 being coiled thereon.

To the board A is secured a bracket 72 on which is pivoted the pawl 73 connected with the tooth 65' of the block 65 and being engaged also on its lower part with the dog 66.

On the rear and front axles on the vehicle are suitably secured four raising devices, or jacks, which are designated in the general view 1 as D, E, F and G. In Figures 23, 24, and 25 is illustrated a preferred way to secure said jacks to the axles, and referring to Figures 23 and 24, 74 designates the front axle of the vehicle, usually of I shape in section, being sided by blocks 75, in order to obtain a square section for same. Rearwards of the cylinder 76 of the corresponding jack is arranged a U shaped clamp 77 the flanges 77' of which are secured through bolts 79 with an opposite clamp 78.

In Figure 25 the means to secure the corresponding jacks to the rear axle 80 is represented; same consisting of a block 81, of rectangular section fitted to the axle, the securing of same with the jack being effected in the same manner as explained above for the front axle.

The four jacks are of identical construction, and we refer here to jack F in the general view, which is detailed in Figures 17 to 20 inclusive. It consists of a cylindrical casing 76 open at the lower end and closed by a threaded cover 82 at the upper end, said cover having a threaded opening therein where is connected the pipe 83, which in turn is connected to the respective pipes 5, 6, 7, and 8, the pipe 5 in this instance for clearness sake being referred to. The pipe 5 is connected with the upper part of the casing 76, having a check valve 84 which allows the passage of the fluid from the casing but prevents passage of the fluid into the same. Although said check valve is of well known construction it is detailed in Figures 21 and 22.

The lower part of the casing 76 has a bore where is threaded the end of a pipe 85 which is connected with the corresponding pipes 13, 14, 15 and 16 of the distributor casing, pipe 13 being referred to for clearness sake. Said pipe 13 is provided with a check valve 86, identical to the above mentioned valve 84.

Within the cylinder 76 is housed a plunger 87, attached to a post 88 the section of which is slightly smaller than the section of the cylinder leaving an annular space 76' between the respective walls for the outflow of the fluid therein.

The post 88 is secured through a threaded stem to a support plate 90.

In the lower inner part of the cylinder 76 an abutment 76" is formed in order to provide a frictional fitting with the post 88, having a packing 91 and packing nut 92 which prevent the leakage of the fluid.

The operation of this system may be reviewed as follows:

Assuming that one of the rear wheels of the vehicle is intended to be raised, the handle 31 is operated opening the cock 9 of the pipe 5 which communicates with the compartment 2 of the distributor casing 1. The handle 39 is also operated which causes the moving of the rod 36 closing the cock 22, and opening the cock 23 and acting on the double way cock 25 closing the incoming of the fluid to compartment 3 and leaving free the incoming of same to compartment 2.

Simultaneously, the knob 69 is pulled and the pawl 73 is moved to engage the next tooth 65' causing the lever 63, bearing the roller 63', to push the casing 55 swinging the latter and forcing the frictional connection of the pulley 62 with the driving belt, whereby to start the operation of the pump due to the gearing transmission 58, 59, 60, and 61. Therefore, the fluid in the tank B will be forced through the pipe 50 to the casing 46 and therefrom to the pipe 51 forward to the pipe 18 where the double way cock 25 is arranged.

The fluid passes through the pipe 5 to the pipe 83, to the upper part of the cylinder 76 pressing the plunger 87 downward to the position illustrated in dotted line in Figure 19. As it was stated before, the check valve 84 will avoid the incoming of the fluid through the pipe 5 to the cylinder 76.

The downward stroke of the plunger 87 will end in a level about the level of pipe 13, through which the fluid is returned to the compartment 3 and therefrom to pipe 23 leading to the tank B.

Once the wheel is raised, and the work required therein ended, the handle 39' is moved in the opposite direction opening the cock 22, closing the cock 23, and closing in the cock 25 the way to the compartment 2 and opening the way to compartment 3.

The fluid will now flow through the pipe 13 from the compartment 3, and being checked by the valve 86, will be forced to the pipe 85, to the annular space 76' acting upwardly on the plunger 87 forcing same upwards to the position shown in full line, in Figure 19. Upon the continuous operation of the pump the fluid outflows through the pipe 5 to the compartment 2 and returns therefrom through the pipe 17 to the tank B.

When the jack F is raised, the knob 70 is pressed against the spring 71, and the stem 68 pushes the dog 66 raising the pawl 73 and the block 65 will be moved inwardly. This movement will cause the pushing of the rod 64 which stops the action of the lever 63, and therefore the pulley 62 being disconnected stops the operation of the pump. The handles 31 and 39' will be reinstated then in their former position.

If two or more wheels, should be needed to be raised the operation will be just the same, it being sufficient to open the cocks corresponding to the jacks D, E, F, and G, in addition to operating the handle 39'.

It is evident that instead of a liquid, a suitable fluid as air, gas, etc., may be used with only slight changes in the construction without departing from the substantial idea of the invention.

We claim:—

A mechanical system for raising vehicles, comprising a fluid tank; a fluid distributor divided into two compartments; four fluid operated jacks fixed to the axles of the vehicle wheels, four pipes in communication with one of the compartments of the distributor and with the upper part of the four fluid operated jacks shut off valves in said pipes; means to operate the opening and closing of the shut-off valves from the seat of the driver of the vehicle; four pipes in communication with the other compartment of the distributor and with the lower part of the jacks; two pipes which respectively communicate with one of the compartments of the distributor and with the fluid tank; shut-off valves in the last mentioned pipes a branched pipe provided with a double way cock communicating each branch of same respectively with each compartment of the distributor, a pumping device with which the branched pipe communicates; means to operate, from the driver's seat, the simultaneous opening and closing of the valves of the three pipes just mentioned, so as to selectively close one of them and open the other, meanwhile closing the double way cock to a compartment of the distributor and opening to the other; and means to operate the starting of the pumping device from the driver's seat.

DIEGO LOMBILLO Y GONZÁLEZ CHÁVEZ.
TOMAS BENITEZ GONZÁLEZ.
ANGEL COBO HARO.